United States Patent
Lauff et al.

(10) Patent No.: US 8,850,392 B2
(45) Date of Patent: *Sep. 30, 2014

(54) METHOD AND COMPUTER SYSTEM FOR DOCUMENT AUTHORING

(75) Inventors: Marcus Lauff, Oftersheim (DE); Florent Nicoulaud, Levallois-Perret (FR); Samuel Rethore, Valbonne (FR); Patrice Seurat, Grasse (FR); Pascal T. C. Spadone, Antibes (FR); Axel Spriestersbach, Karlsruhe (DE); Cedric S. P. Ulmer, Nice (FR); Thomas Ziegert, Darmstadt (DE)

(73) Assignee: SAP AG, Walldorf (DE)

(*) Notice: Subject to any disclaimer, the term of this patent is extended or adjusted under 35 U.S.C. 154(b) by 2168 days.

This patent is subject to a terminal disclaimer.

(21) Appl. No.: 10/583,184

(22) PCT Filed: Dec. 15, 2004
(Under 37 CFR 1.47)

(86) PCT No.: PCT/EP2004/053478
§ 371 (c)(1),
(2), (4) Date: Sep. 5, 2008

(87) PCT Pub. No.: WO2005/059743
PCT Pub. Date: Jun. 30, 2005

(65) Prior Publication Data
US 2009/0024937 A1 Jan. 22, 2009

(30) Foreign Application Priority Data
Dec. 18, 2003 (EP) .................................. 03029190

(51) Int. Cl.
G06F 9/44 (2006.01)
(52) U.S. Cl.
CPC .................................... *G06F 8/20* (2013.01)

USPC ............................................................ 717/123
(58) Field of Classification Search
USPC ............................................................ 717/123
See application file for complete search history.

(56) References Cited

U.S. PATENT DOCUMENTS 5,390,354 A * 2/1995 de Heus et al. ............... 715/234
5,600,789 A * 2/1997 Parker et al. ............... 714/38.11
(Continued)

FOREIGN PATENT DOCUMENTS

WO WO-0177822 10/2001
WO WO-2005059742 A1 6/2005
WO WO-2005059743 A1 6/2005

OTHER PUBLICATIONS

Dermler et al., "Flexible pagination and layouting for device independent authoring," IBM, 2003, 5pg.*

(Continued)

*Primary Examiner* — Ryan Coyer
(74) *Attorney, Agent, or Firm* — Schwegman Lundberg & Woessner, P.A.

(57) ABSTRACT

Integrated development environment IDE (999), method and computer system for developing user interface documents. An editor (104) is used for editing a user interface document. An adaptation engine (105) generates device class specific representations of the user interface document. Each device class specific representation refers to a respective device class. Device class dependent tools (120) of the IDE (999) are used for generating device class specific information and providing it to the author. Device class specific information can be information about the complexity of the user interface by device class provided by a complexity indicator (121), information about how many pages are generated for which device class provided by a device class dependent view (122) or information about the layout for various device classes provided by a frames layouting view (124).

21 Claims, 9 Drawing Sheets

(56) References Cited

U.S. PATENT DOCUMENTS

| | | | |
|---|---|---|---|
| 5,724,262 A * | 3/1998 | Ghahramani | 714/E11.192 |
| 5,808,908 A | 9/1998 | Ghahramani | |
| 6,173,286 B1 | 1/2001 | Guttman et al. | |
| 6,366,918 B1 | 4/2002 | Guttman et al. | |
| 6,411,700 B1 | 6/2002 | Rojas | |
| 6,658,648 B1 | 12/2003 | Douceur et al. | |
| 6,750,885 B1 | 6/2004 | Finch, II et al. | |
| 6,976,218 B2 | 12/2005 | Stanford-Clark | |
| 7,080,323 B2 | 7/2006 | Knott et al. | |
| 7,124,398 B2 | 10/2006 | Chen et al. | |
| 7,308,288 B2 | 12/2007 | Pasquale et al. | |
| 2002/0012423 A1 | 1/2002 | Rojas | |
| 2002/0012427 A1 | 1/2002 | Rojas | |
| 2002/0054669 A1 | 5/2002 | Rojas | |
| 2002/0099740 A1* | 7/2002 | Patrick | 707/526 |
| 2002/0113816 A1* | 8/2002 | Mitchell et al. | 345/734 |
| 2002/0156799 A1 | 10/2002 | Markel et al. | |
| 2003/0090513 A1 | 5/2003 | Ramakrishnan | |
| 2004/0083463 A1 | 4/2004 | Hawley | |
| 2004/0090458 A1 | 5/2004 | Yu et al. | |
| 2005/0015747 A1* | 1/2005 | Zatloukal et al. | 717/109 |
| 2005/0054384 A1 | 3/2005 | Pasquale et al. | |
| 2005/0086579 A1 | 4/2005 | Leitner et al. | |
| 2005/0210397 A1 | 9/2005 | Kanai et al. | |
| 2006/0026506 A1 | 2/2006 | Kristiansen et al. | |
| 2006/0095276 A1* | 5/2006 | Axelrod et al. | 705/1 |
| 2006/0259865 A1 | 11/2006 | Knott et al. | |
| 2006/0277157 A1 | 12/2006 | Seidl et al. | |
| 2007/0162874 A1 | 7/2007 | Lauff et al. | |

OTHER PUBLICATIONS

Leszek, Pawel, "XML development with Eclipse," IBM, 2006, 10pg.*
Noble et al., "Interactive Design Metric Visualization: Visual Metric Support for User Interface Design," IEEE, 1996, 8pg.*
Jacobs et al., "Adaptive Grid-Based Document Layout," ACM, 2003, 10pg.*
"Search Report for International Applicaiton No.", (Jan. 25, 2005),3 pgs.
"XML Editor with Intelligent Editing", http://web.archive.org/web/20021019120059/http://www.altova.com/features_editing.html, (2005), 8pgs.
Hori, Masahiro, et al., "Annotation-Based Web Content Transcoding", *Computer Networks*, 33, (Jun. 2000),197-211.
"U.S. Appl. No. 10/582,937 Final Office Action mailed Oct. 28, 2010", 23 pgs.
"U.S. Appl. No. 10/582,937, Final Office Action mailed Jul. 5, 2012", 25 pgs.
"U.S. Appl. No. 10/582,937, Non Final Office Action mailed Feb. 15, 2012", 26 pgs.
"U.S. Appl. No. 10/582,937, Non-Final Office Action mailed May 26, 2010", 16 pgs.
"U.S. Appl. No. 10/582,937, Response filed May 3, 2012 to Non Final Office Action mailed Feb. 15, 2012", 11 pgs.
"U.S. Appl. No. 10/582,937, Response filed Feb. 10, 2011 to Final Office Action mailed Oct. 28, 2010", 13 pgs.
"U.S. Appl. No. 10/582,937, Response filed Aug. 10, 2010 to Non Final Office Action mailed May 26, 2010", 13 pgs.
"U.S. Appl. No. 10/582,937, Response filed Oct. 5, 2012 to Final Office Action mailed Jul. 5, 2012", 11 pgs.
Comber, Tim, et al., "Investigating Layout Complexity" Southern Corss University, Southern Cross University, [Online]. Retrieved from the Internet: <URL: http://citeseerx.ist.psu.edu/viewdoc/download?doi=1 0.1.1.88.7330&rep=rep1 &type=pdf, (Mar. 2003), 21 pgs.
Melcher, R, et al., "Improving the user experience on mobile devices and services", In: Proceeding of the Telecommunication and Mobile Computing, Workshop on telecommunications and mobile computing, (2003), 4 pgs.
Royo, J. A., et al., "AD US: Indirect Generation of User Interface on Wireless Devices", University of Zaragoza, (Jun. 16, 1999), 5 pgs.
"U.S. Appl. No. 10/582,937, Non Final Office Action mailed May 22, 2013", 28 pgs.
"U.S. Appl. No. 10/582,937, Examiner Interview Summary mailed Mar. 14, 2013", 3 pgs.
"U.S. Appl. No. 10/582,937, Non Final Office Action mailed Oct. 25, 2013", 27 pgs.
"U.S. Appl. No. 10/582,937, Preliminary Amendment filed Jun. 15, 2006", 6 pgs.
"U.S. Appl. No. 10/582,937, Response filed Aug. 16, 2013 to Non Final Office Action mailed May 22, 2013", 11 pgs.
Application U.S. Appl. No. 10/582,937, Final Office Action mailed May 20, 2014, 38 pgs.
Comber, Tim, et al., "Evaluating Usability of Screen Designs with Layout Complexity", Southern Cross University, [Online] retrieved from the internet: <http://epubs.scu.edu.au/cgi/viewcontent.cgi?article=1000&context=comm_pubs>, (1995), 1-6.

* cited by examiner

METHOD AND COMPUTER SYSTEM FOR DOCUMENT AUTHORING

This application is a U.S. National Stage Filing under 35 U.S.C. 371 from International Patent Application No. PCT/EP2004/053478, filed on Dec. 15, 2004, and published as WO 2005/059743 A1 on Jun. 30, 2005, which in turn claims the priority benefit of EP Application No. 03029190.0 filed on Dec. 18, 2003, the entire content of each application being incorporated herein by reference.

FIELD OF THE INVENTION

The present invention generally relates to electronic data processing, and more particularly, relates to methods, computer program products and systems for document authoring.

BACKGROUND OF THE INVENTION

Some software development platforms, such as the Eclipse Platform, are designed for building integrated development environments (IDEs) that can be used to create applications as diverse as web sites, embedded Java™ programs, C++ programs, and Enterprise JavaBeans™. Although the Eclipse Platform typically have built-in functionality, most of that functionality is very generic. It takes additional tools to extend the Platform for handling new content types, new functionality for existing content types, and to focus the generic functionality on specific tasks.

The Eclipse Platform is built on a mechanism for discovering, integrating, and running modules called plug-ins. For example, a tool provider can write a tool as a separate plug-in that operates on files in the workspace and surfaces its tool-specific user interface (UI) in the workbench. When the Platform is launched, a developer (also referred to as author) is presented with an IDE composed of the set of available plug-ins.

More and more heterogeneous devices access application servers running applications developed by using an IDE. Current IDEs support the development of user interfaces for applications that were originally foreseen to interact with homogenous delivery context (e.g., a screen of low resolution, such as 800×600 pixels). Developers have to adapt application user interfaces for different types of delivery context. This task becomes increasingly difficult with the prior art IDEs having a lack of specific support for device independent development of user interface documents.

Some web-development tools, such as DreamWeaver from Macromedia Inc., provide tools for XML validation, browser pre-visualisation and code completion. However, there is a lack of support for transforming device independent representations into various target languages, such as WML or VoiceXML. Further, where device independent development is enabled it lacks support for visualization of the results.

SUMMARY OF THE INVENTION

The present invention provides computer system, method and an integrated development environment according to the independent claims for improving the support for device independent authoring of user interface documents.

The various embodiments of the invention provide alternative solutions to support a document author to improve and accelerate the generation of a device class independent user interface document by generating device class specific information and providing it to the author.

In one embodiment according to claim 1 the author can get information about the complexity of the user interface by device class through a complexity indicator.

In an alternative embodiment according to claim 10 the author can see how many pages are generated on the basis or the document for which device class in a device class dependent view.

In a further alternative embodiment according to claim 11 the author can get information about the layout for the various device classes in a frames layouting view.

Each of the alternative embodiments supports the author to identify problems in a user interface document related to device class specific restrictions already during the development of the document. Identifying such problems at early stages of the development usually minimizes efforts for adjusting the device independent document to better comply with the various device class specific restrictions. A result of the device specific document analysis with the above embodiments can also be that a user interface document cannot be used at all by devices belonging to a specific device class. In this case the author may not release the document for the specific device class.

The aspects of the invention will be realized and attained by means of the elements and combinations particularly pointed out in the appended claims. Also, the described combination of the features of the invention is not to be understood as a limitation, and all the features can be combined in other constellations without departing from the spirit of the invention. It is to be understood that both the foregoing general description and the following detailed description are exemplary and explanatory only and are not restrictive of the invention as described.

DETAILED DESCRIPTION OF THE INVENTION

Figure 1:
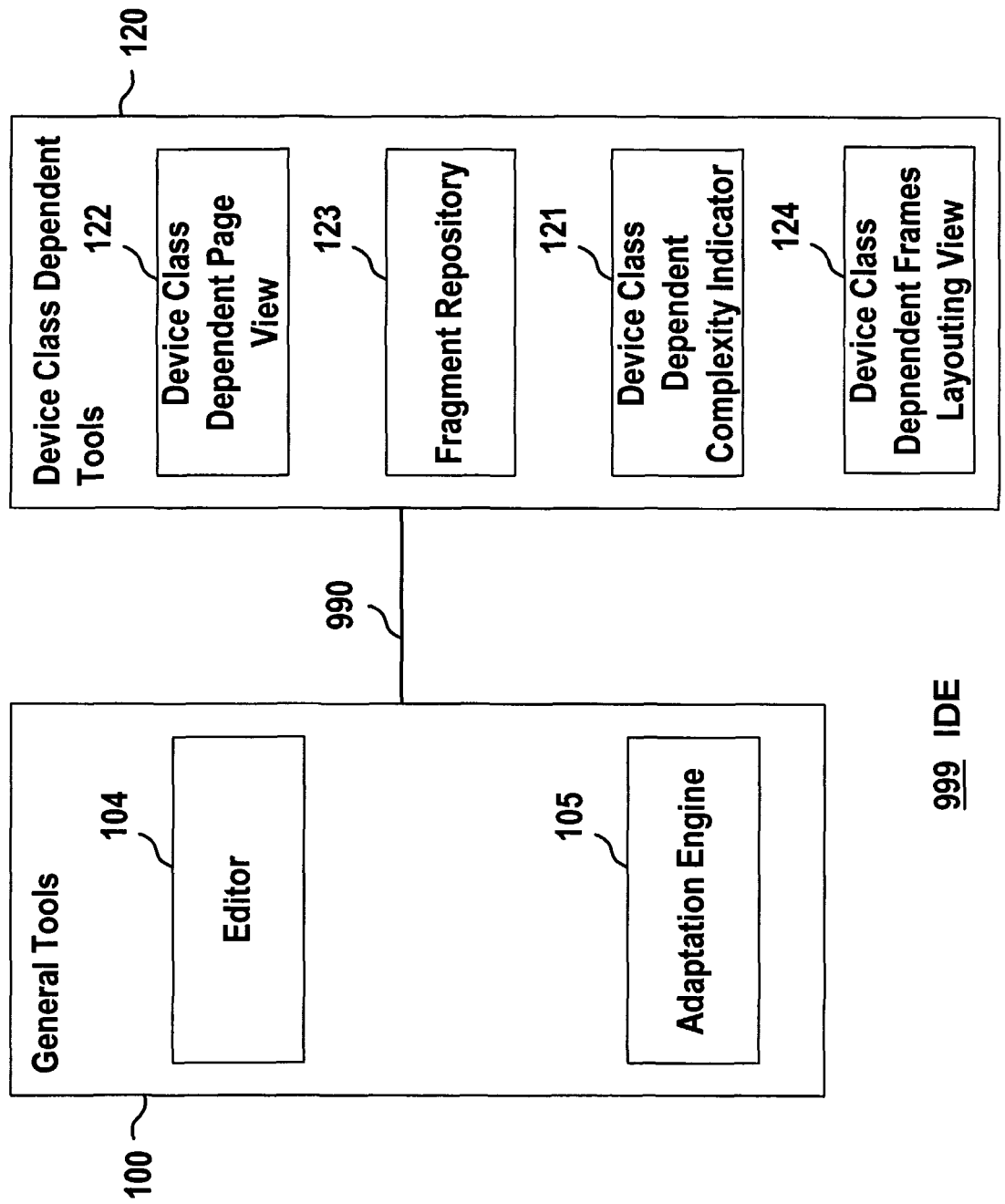
FIG. 1 is a simplified block diagram of an integrated development environment (IDE) for generating user interface documents according to the invention.

FIG. 1 is a simplified block diagram of an integrated development environment 999 (IDE) that can be used for the development of user interface documents. The IDE can be implemented as a computer program running on a computer system that includes one or more computing devices. The IDE 999 includes a general tool set 100 and a device class dependent tool set 120 that is integrated 990 with the general tool set 100. Examples of tools included in the general tool set are an editor 104 and an adaptation engine 105. Examples of tools that can be included in the device class dependent tool set 120 are a device class dependent page view 122, a fragment repository 123 supporting device dependent fragments, a device dependent frames layouting view 124 and/or a device class dependent complexity indicator 121. The tools are explained in detail in the later description.

The following description describes by way of example the development of a user interface document on the basis of a Renderer Independent Markup Language (RIML) document by using the IDE 999. However, the present invention can be applied to any other document type, such as documents written in Hypertext Markup Language (HTML), Extensible Markup Language (XML), Java, etc. RIML is an XML based markup language. The user interface document can be stored in form of a file or any other suitable data structure.

The IDE 999 can include a variety of further tools that support the author of the document to reduce the development time for document development and to detect and correct errors within the document. The device class dependent tools 120 provide special support for the development of documents that are used in mobile applications and, therefore, need to be compatible with a variety of device classes. A device class includes a plurality of restrictions that are typical for devices (e.g., mobile devices) belonging to the device class.

The first step in document development is usually to create a development space within the IDE 999, where the document(s) can be assigned to. For example, when using the Eclipse platform as IDE, an Eclipse project can be created for working on RIML files.

A device independence plugin installation folder can include several folders. Each of the folders stores information for a specific tool of the IDE.

For example, a template folder can include RIML templates available within the authoring environment to be used by a template wizard. A quickhelp folder can include XML description files used by a quickhelp tool for providing help information related to a tag on which a cursor is positioned. A fragments folder can include RIML fragments available within the authoring environment, plus descriptions of the respective fragments. A schemas folder can include XSD grammar required by a RIML validation and code completion tool to work.

The various tools of the IDE and how they interact to improve device independent authoring are described in the following.

Figure 2:
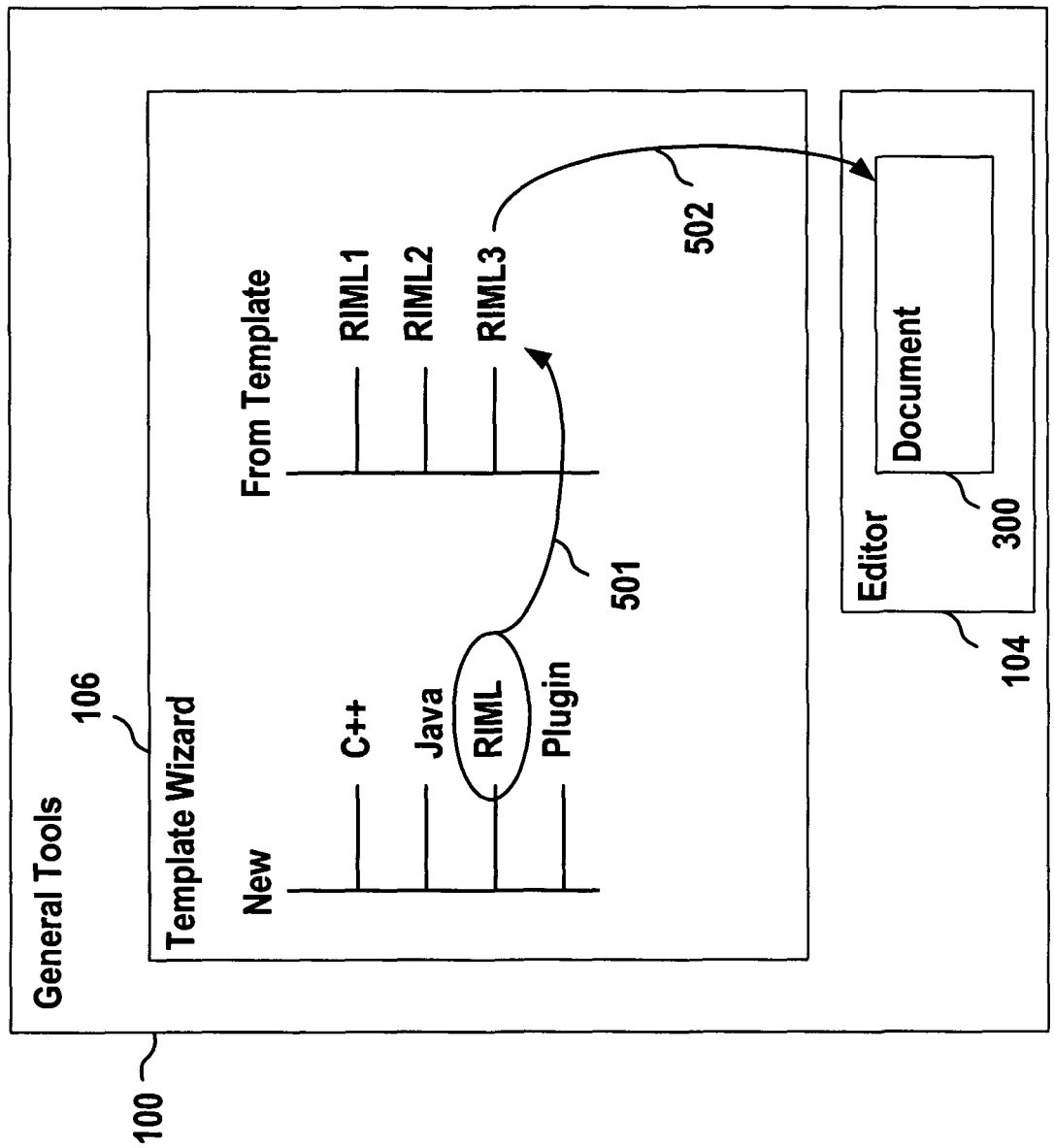
FIG. 2 illustrates an implementation of a selection screen of a template wizard that can be used with the IDE.

FIG. 2 illustrates an implementation of a selection screen of the template wizard 106 to support the document author to avoid starting from scratch when creating 502 a new document 300. Predefined document templates RIML1 to RIML3 allow the author to reuse usability approved templates and modify them. For example, the templates can be RIML documents which contain a specific layout, and which may be tailored for a specific application domain, user group or various device classes.

For example, after having selected RIML (illustrated by an ellipse) in a New-section of the selection screen to indicate that the author intends to create a RIML document, the author can select 501 a template RIML3 in a From-Template section of the selection screen. The selected template RIML3 is then loaded into the editor 104, where it can be saved as the new document 300.

The selection function as described can be integrated in the IDE UI or displayed on a popup window prompting the author. By checking target user group(s), application domain and device classes for which the application is to be tailored, the selection screen can be used to filter the available templates to display only templates that comply with the selection criteria entered on the selection screen. In case no template matches the selection criteria, a default template can be selected. The default template includes at least correct RIML element attributes and basic mandatory elements such as head and body. The template can then be stored in the corresponding development space of the IDE (e.g., Eclipse project) under a file name defined by the author. In the following it is assumed that the development space is a RIML folder.

Figure 3:
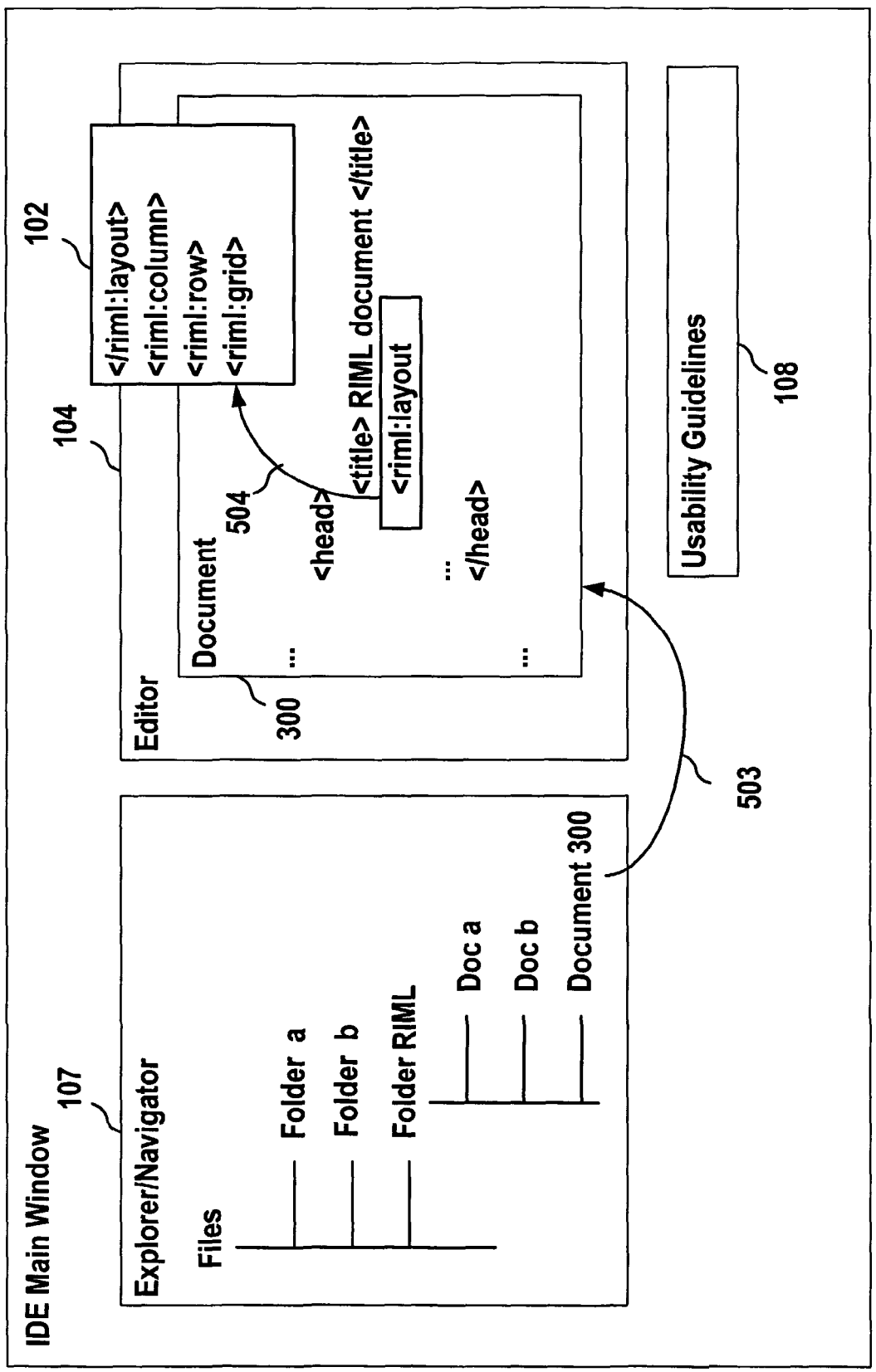
FIG. 3 is one implementation of the main window of the IDE including an explorer/navigator view and an editor.

FIG. 3 is a possible implementation of the main window of the IDE 999. The IDE can further include an explorer/navigator view 107 for visualizing the files that are assigned to the RIML folder. The explorer/navigator view 107 can be implemented similar to the Package Explorer in the Eclipse platform.

The explorer/navigator view 107 is interfaced to the editor 104 so that the document file 300 can be directly loaded 503 into the editor 104 through a corresponding interaction of the author with the explorer/navigator view. For example, the author may double click on the file name or select a corresponding open function from a menu or toolbar of the explorer/navigator view. The editor 104 supports typical functions, such as, text insertion, copy, paste, cut or syntax colouring. For example, the editor can 104 be implemented on the IDE main window or in separate window.

The author can select a perspective, e.g., by selecting a corresponding function from a menu or toolbar of the explorer/navigator view 107. A perspective is a set of tools associated with an extension (e.g., the riml extension of RIML document files), and it defines a certain layout for these tools. For example, In the Eclipse IDE, one perspective is associated with one plugin, wherein a plugin can be composed of several views.

The editor 104 can be further interfaced to a template XML description file including information about the different available document templates, such as for example, meta data about device classes supported by the templates.

Source code example 1 shows a template XML description file that includes a root element named RIMLTemplate, and which has RIMLTemplate elements, such as DeviceClass, ApplicationDomain, TargetdUserGroups and Keywords as children. Source code example 1 shows the content of the RIMLTemplate node for a template called V2test_pag_pagcol.riml.

Source code example 1:

```
<RIMLTemplate>
    <Path>./V2test_pag_pagcol.riml</Path>
    <Name>V2test_pag_pagcol.riml</Name>
    <DeviceClass>1</DeviceClass>
    <DeviceClass>2</DeviceClass>
    <DeviceClass>3</DeviceClass>
    <DeviceClass>4</DeviceClass>
    <DeviceClass>7</DeviceClass>
    <ApplicationDomain>Enterprise</ApplicationDomain>
    <TargetedUserGroups>Expert</TargetedUserGroups>
    <TargetedUserGroups>Professional</TargetedUserGroups>
    <Keywords>sample paginated column</Keywords>
</RIMLTemplate>
```

The source code 1 XML description file includes information about:
- The path and filename relatively to the IDE root folder,
- the name of the template (here name can mean label, because the actual file name is included in the path element),
- the different device classes handled,
- the application domain concerned, and
- the targeted User Groups targeted by this template.

The IDE can further include a link to a usability guideline tool that allows the author to access usability guidelines. For example, usability guidelines, such as the Consensus usability guidelines, are available through the Internet or locally. The usability guideline tool can be interfaced to the editor 104 to be used as an authoring help. For example, a corresponding hyperlink 108 in the IDE can guide the author to the usability guideline tool.

The IDE can further include a context sensitive help tool to provide to the author a quick info about a specific tag used in the document 300 when loaded into the editor 104. The information can include a short description of the tag's function and corresponding hyperlinks to the RIML usability guideline. Hyperlinks proposed by the context sensitive help tool are the ones considered as relevant with respect to the edited RIML document from a usability perspective. For example, the context sensitive help tool can be called through a specific function key or a corresponding IDE menu entry or other control element. When evoking the context sensitive help tool, for example, a popup window can show the tag's description and the links to the usability guideline.

The IDE can further include a quickhelp XML description file. The quickhelp file can include the relevant content for the help on tags. Source code example 2 shows a quick help file that includes a root element called tags having child elements. In the example, the name of a child element names is the name of the tag concerned.

source code example 2:

```
<?xml version="1.0" encoding="UTF-8"?>
<tags xmlns="http://not-real"
    xmlns:riml="no-need-to-edit-this1"
    xmlns:smil="no-need-to-edit-this2"
    xmlns:html="no-need-to-edit-this3"
    xmlns:eccdc="no-need-to-edit-this4"
>
<riml:layout>
    <description>
```

All RIML layout definition is enclosed by the layout element. The layout element has one child, which can be either be a frame element or a RIML layout container element.

```
    </description>
    <link>
        <label>Display - Text</label>
        <URL>http://apg.vienna.org/APGDetail.php?id=126</URL>
    </link>
    <link>
        <label>Page Types - Relationships</label>
        <URL>http://apg.vienna.org/APGDetail.php?id=194</URL>
    </link>
    <link>
        <label>Spacing in dialogs</label>
        <URL>http://apg.vienna.org/APGDetail.php?id=308</URL>
    </link>
    <link>
        <label>Layout conventions</label>
        <URL>http://apg.vienna.org/APGDetail.php?id=311</URL>
    </link>
    <link>
        <label>Relationship of elements</label>
        <URL>http://apg.vienna.org/APGDetail.php?id=315</URL>
    </link>
</riml:layout>
```

The IDE can further include a code completion tool 102. The code completion tool 102 proposes different possibilities for auto-insertion of text (e.g., </riml:layout>, <riml:column>, <riml:row>, <riml:grid>) in the editor 104 dependent on the context at a specific position (e.g., <riml:layout) within the document 300. For example, the specific position can be defined in the editor 104 through the cursor position. Such a code completion tool 102 is described in the European patent application 02000106.1 published under the publication number EP1326175. For example, the author can invoke 504 the code completion tool 102 from within the editor 104 by using a specific control key combination, such as CTRL+SPACEBAR. A popup window 102 can then display the different possibilities for completion. These possibilities can rely on schemas defined in the html root element of the document 300, to propose only valid completion options. The author selects one of the proposed completion texts (e.g., by double-clicking) to trigger the insertion of the text. The code completion tool 102 can also be applied to attributes within an element.

Figure 4:
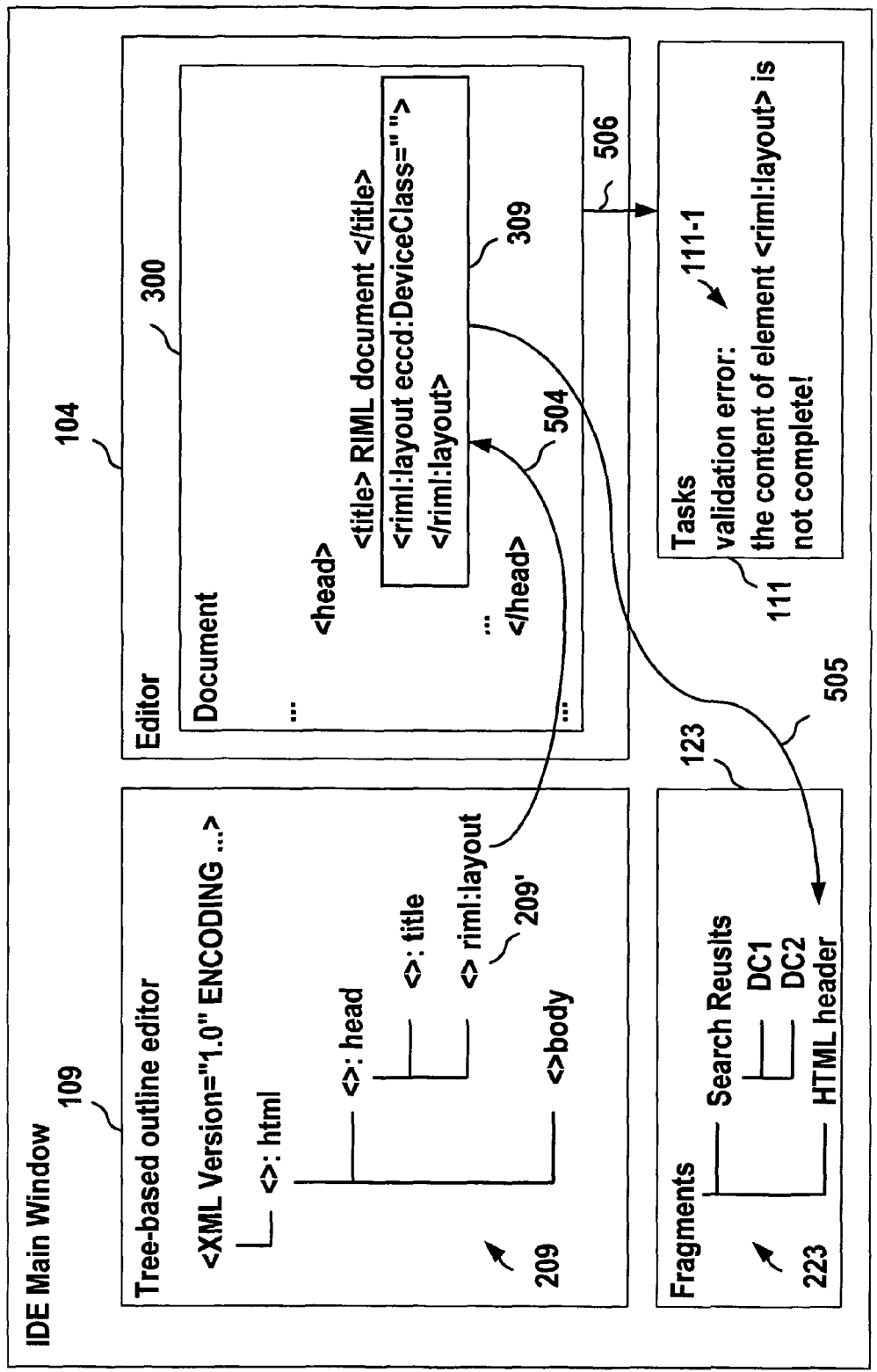
FIG. 4 shows an implementation of the IDE main window further including a tree-based outline editor and a fragment repository.

FIG. 4 shows an implementation of the IDE main window when the IDE 999 further includes a tree-based outline editor 109 for generating an outline view 209 of the edited document 300, such as an XML tree view 209 of the RIML document 300. The tree-based outline editor 109 further can make editing proposals for the document using popup windows similar to the code completion tool. The tree-based outline editor 109 is interfaced with the editor 104, in the sense that when selecting an element 209' in the outline view 209, the editor 104 highlights 504 the corresponding text portion 309 of the document 300.

The author can see a list of elements that can be added as children to a current element (e.g., the head element) and further a list of attributes that can be added to the current element by selecting the current element of the outline view 209. A popup window can propose similar completion as the code-completion tool. When the author selects a completion it will be added to the tree of the outline view 209 and other views as, for example, the editor 104 view, will be updated accordingly.

The IDE 999 can further include a fragment repository 123 for supporting the reuse of fragments of RIML documents. The fragment repository 123 allows the author to load and save identified RIML fragments. When the IDE 999 is started, the fragment repository 123 can be visualized as a tree structure 223. The fragment repository includes fragments already saved in the past. The author creates the structure of the fragment repository when deciding where to save the different fragments. For example, the author may choose the hierarchy of the RIML document, which may be decomposed into the different tasks. It may be decomposed into different versions of a search result based on the various device classes DC1, DC2.

The author can save the whole head part of a RIML document as a root node that contains all layout information. Then, layout parts that are specific to corresponding device classes DC1, DC2 can be saved as child fragments. Thus, if a further author wants to have a layout that is specific to a single device class, he/she can directly use the child fragment that is specific to the desired device class DC1, DC2 layout instead of using the root node containing also information that is not necessary for the desired device class.

The fragment repository has at least the functions "save fragment" and "load fragment".

To save a fragment, the author highlights the desired fragment in the editor (e.g., through a mouse or a keyboard). The fragment can be any part of the document text (e.g., text portion 309). For example it can be but does not have to be a valid XML fragment. Then, the author selects the node the fragment repository view where the fragment is to be appended to. The author can enter a name and a description/comment of the fragment through conventional data entry means. The fragment will then be appended next to the selected node in the repository tree under the entered name.

The author can load a fragment from the fragment repository into the current document within the editor. To do so, the author places the cursor in the editor where the fragment is to be inserted, then selects the corresponding fragment the fragment repository tree and triggers insertion. The fragment will then be inserted 505 at the correct place.

Further, for a fragment an XML file containing metadata of the fragment can be generated. Source code example 3 shows an example of such a fragment XML file.

Source code example 3:

```
<!DOCTYPE fragment SYSTEM "fragment.dtd">
<?xml version="1.0" encoding="UTF-8" ?>
<fragment:fragment>
    <fragment:name>Device-Class1</fragment:name>
    <fragment:parent>SearchResults</fragment:parent>
    <fragment:parent-
file>SearchResults.xml</fragment:parent-file>
    <fragment:comment></fragment:comment>
    <fragment:content>
<section        eccdc:deviceClassOneOf="DeviceClass1"
riml:frameId="table-content-frame">
        <table>
            <tr>
                <td class="BgBlue">
                    Michael Sting
                </td>
            </tr>
            <tr>
                <td class="BgBlue">
                    +49-7099-99-9999
                </td>
            </tr>
        </table>
    </section>
    </fragment:content>
</fragment:fragment>
```

Examples of metadata that can be included in fragment XML files are: the fragment name, the fragment parent (used by the tool for the structure of the view), the fragment parent-file, fragment comments (entered by the author when saving a fragment), and the content that contains the verbatim of the saved fragment.

The IDE can further include a validation tool for evaluating the validity of the document 300. The XML standard allows one to specify XML schemas being in use in the current document 300 from the root element of the current document 300. For example, this root element can be an HTML element. Locating XML schema files can be done by using the schemaLocation attribute from the XML schema namespace. For example, the RIML document 300 can be validated 506 against RIML schemas given in an HTML element. Thus, the author can quickly identify errors and correct the errors on the basis of appropriate error messages 111-1 generated by the validation tool.

If the document is valid, for example, a popup window can convey the message to the author. If the document is invalid, a tasks view 111 of the IDE can be used to show the different errors. The task view 111 can be displayed simultaneously with the editor 104 and can be interfaced to the editor. When selecting an error 111-1 in the task view the editor highlights the corresponding position 309 within the document 300 that has caused the error.

Validation can be based on schema files given in the HTML element. The required RIML schemas can be found in a corresponding folder. The validation tool can find the schemas using relative paths (e.g., relative to the RIML folder as a basis).

Figure 5:
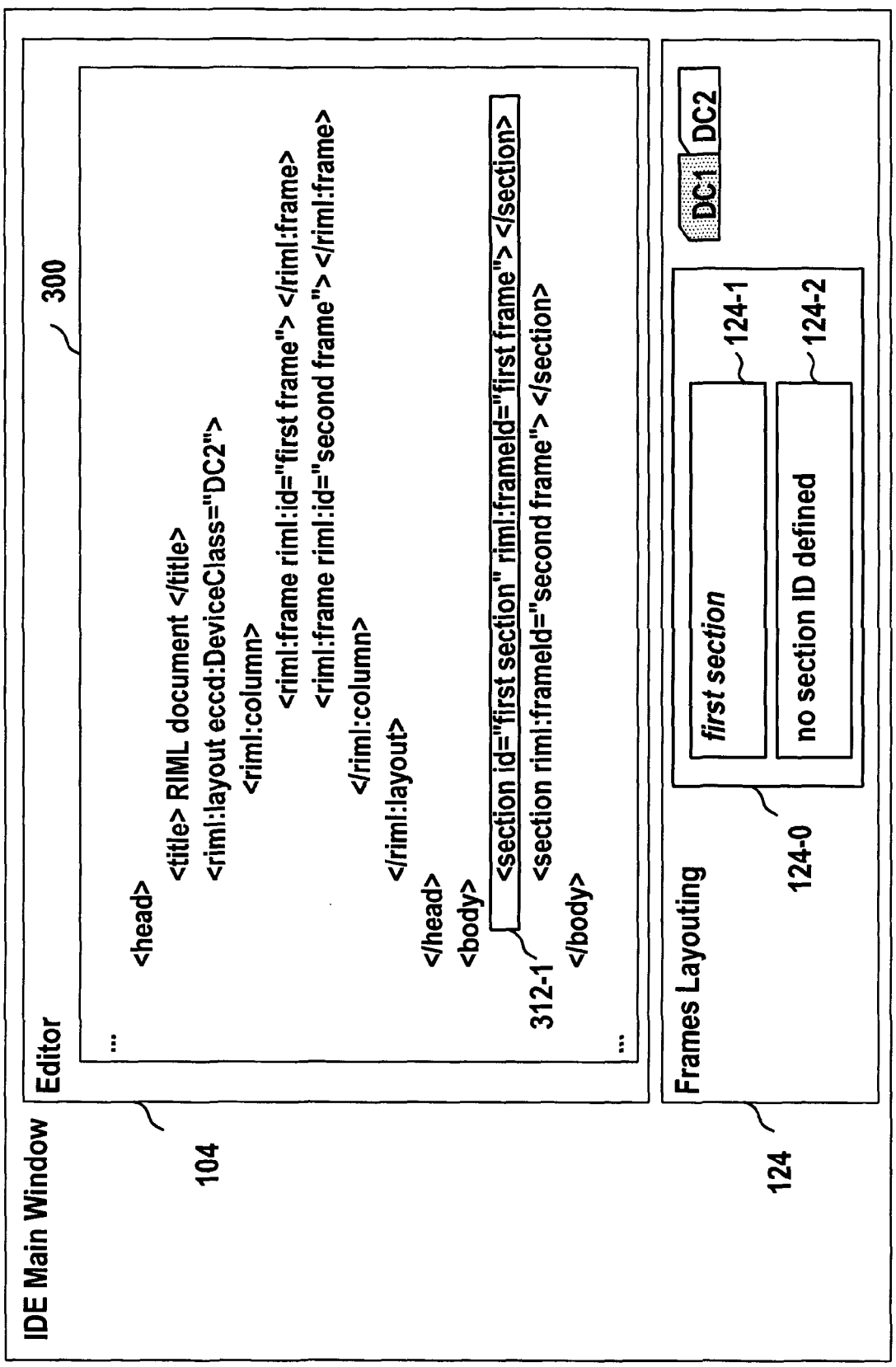
FIG. 5 illustrates the IDE main window when further including a device dependent frames layouting view.

FIG. 5 illustrates the IDE when further including a device dependent frames layouting view 124 to provide to the author an overview of what the presentation structure will look like for the various device classes. Document pagination and transformation may be disregarded by the frames layouting view. Similar to frames in HTML, the author has a view of where various portions of the document will be presented when the document is displayed (e.g., how rows and columns of the document will be distributed). Differences for the various device classes can result from, for example, using layout components that are tailored to a specific device class and cannot be used for other device classes.

For example, for device class DC1 (grey shaded tab) the frames layouting view 124 shows a layout that is composed of one column 124-0, which includes two frames 124-1, 124-2. Each frame has one section assigned to it. The highlighted section 312-1 in the editor 104 corresponds to the selected element (illustrated by "first section" in italics) in the frames layouting view 124. This is achieved by interfacing the editor 104 with the frames layouting view 124 accordingly. For example, when the author selects a section within first frame 124-1 the editor highlights the corresponding text section 312-1. The author can also select a section of the editor text 312-1 and the frames layouting view 124 will highlight the corresponding frame 124-1.

Figure 6:
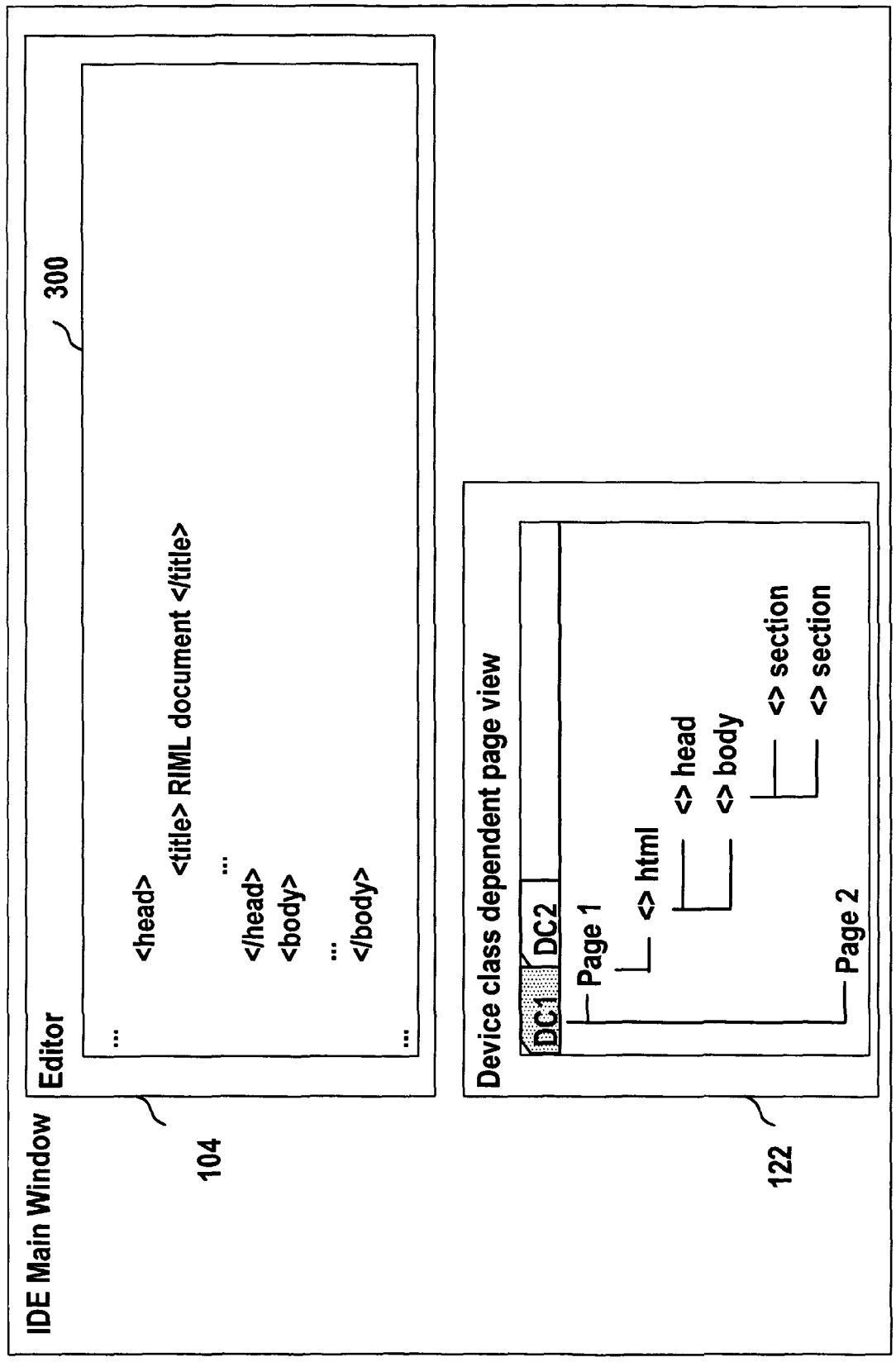
FIG. 6 shows the IDE main window further including a device class dependent page view.

FIG. 6 shows the IDE 999 further including the device class dependent page view 122 to provide information to the author about how the document 300 will be paginated by the adaptation engine 105 for various device classes DC1, DC2. Such a tool is described in the European patent application 03024356.2.

For example, the author can start the adaptation engine 105 from a corresponding menu of the IDE main window. Adaptation engines, such as the consensus adaptation engine, are known in the art. An adaptation engine is used to generate device class specific representations 301, 302 (cf. FIG. 8) of the document 300. In general, the document 300 includes a hierarchy of layout components. This hierarchy can be adapted to various device classes DC1, DC2 in different ways. This may result in different representations 301, 302 of the document 300 for various device classes DC1, DC2. For example, a specific layout component may be suitable for a first device class DC1 but not a second one DC2. This specific layout component can be suppressed by the adaptation engine 103 for the second device class DC2 and, therefore, does not become part of the document's representation 302 for the second device class DC2. An appropriate preview tool may allow the author to choose a specific emulator for a preview. The output of the adaptation engine 103 is generated for the chosen emulator. The author can browse through generated sub-pages in the preview of the document.

For generating the device-class dependent view 122 the adaptation engine may stop after the pagination step. The output of the adaptation engine corresponds to paginated pages (e.g., Page 1, Page 2) of the document 300. As a result of this pre-pagination run of the adaptation engine, the author can see where different parts of the document 300 will be split, dependent on the device class DC1, DC2.

The example of FIG. 6 shows a preview of how the currently edited RIML document 300 will be paginated for a first device class DC1 (grey shaded tab). For example, the author can access the pagination previews of the other device classes DC2 by selecting the corresponding tab. The adaptation engine output includes the content of each generated sub-page. For example, the RIML document has at least two sub pages (Page 1 and Page 2, further sub-pages can be accessed by scrolling). The author can expand the nodes of a sub-page so as to see their detailed content.

The device class dependent page view 122 integrates part of the adaptation engine 105 (up to the pagination step) with the editor 104. For example, a RIML document loaded in the editor 104 is provided to the adaptation engine 105 and a set of generated sub-pages Page 1, Page 2 is presented to the author. Thus, the author is enabled through the device dependent page view 122 to elaborate during the development of the document 300 how specific changes to the document 300 will affect the appearance of the corresponding user interface on various device classes. The author can correct the document immediately when undesired pagination results make the user interface unusable on a specific device. If this would be done once the document development is finished, a correction would most probably imply major modifications to readjust the document for compliance with all device classes.

Figure 7:
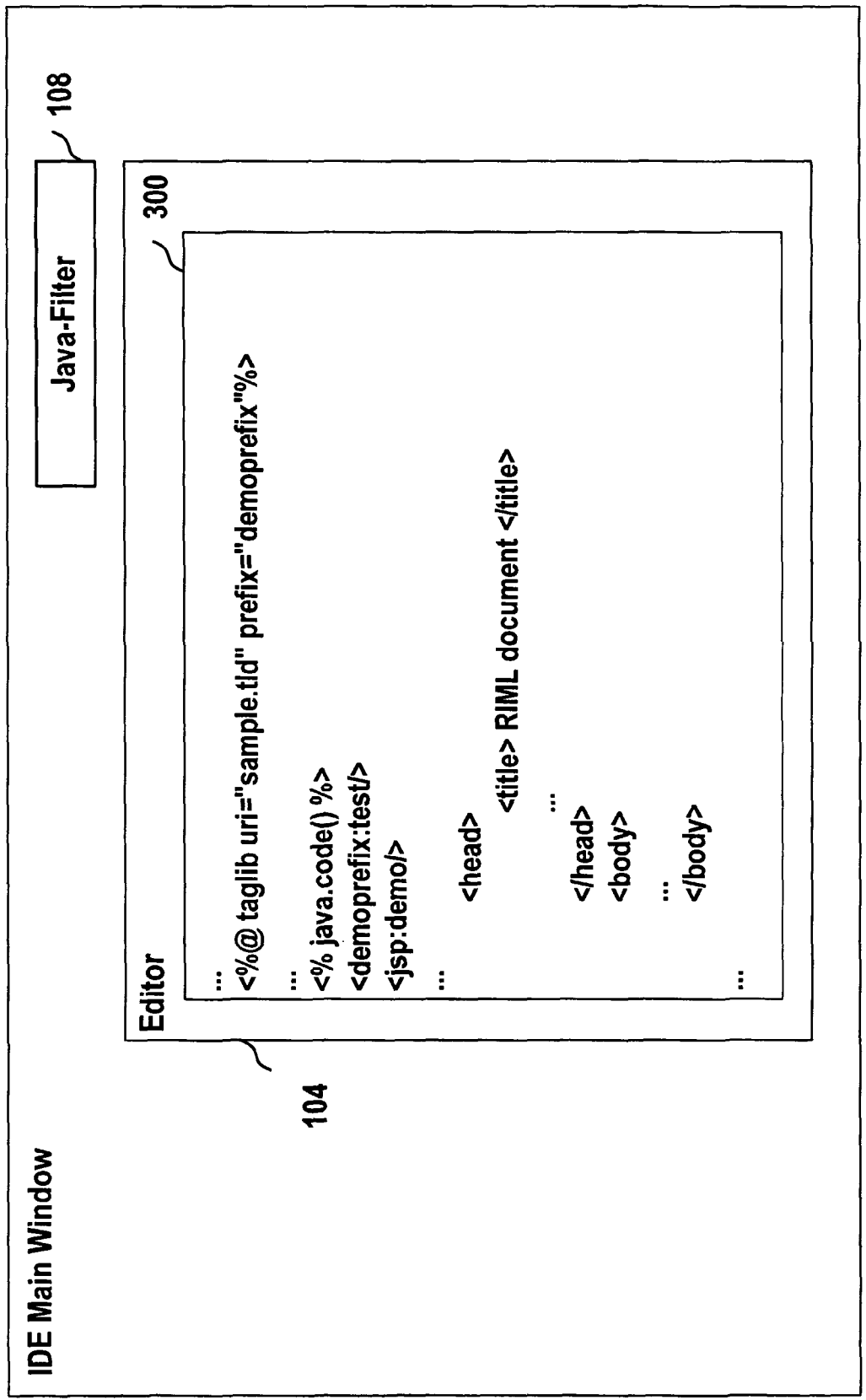
FIG. 7 shows the editor when combined with a Java filtering tool in the IDE main window.

FIG. 7 shows the editor 104 editing the document 300 when including Java code besides XML based code. To handle such a document, the IDE 999 can further include a Java filtering tool 108 to hide Java code when using XML views, and to switch back to Java code when editing Java. For example, inserting Java code into the RIML document poses problems for XML view tool based editor because Java code does not respect the XML rules and, therefore, breaks the XML model that needs to be respected for the XML tools to work normally.

The author can activate a Java code view by using the Java filtering tool 108 that allows editing Java code. For example, the Java filtering tool can have a corresponding graphical representation in the IDE main window (e.g., a button or menu entry). For example, Java code can be recognised by start characters "<%" and end characters "%>". The Java filtering tool can also handle JSP tag prefixes.

The author can switch back to the XML view to work with XML tools. The Java code may be hidden in the editor 104 when the Java filter is active. Java code that is present prior to the HTML root element of the document can be classified as a comment, as an XML document doesn't allow any content prior to the root element.

The Java filtering tool 108 has no impact on the content of the document 300 when saved. The saved document 300 includes the correct Java code.

Figure 8:
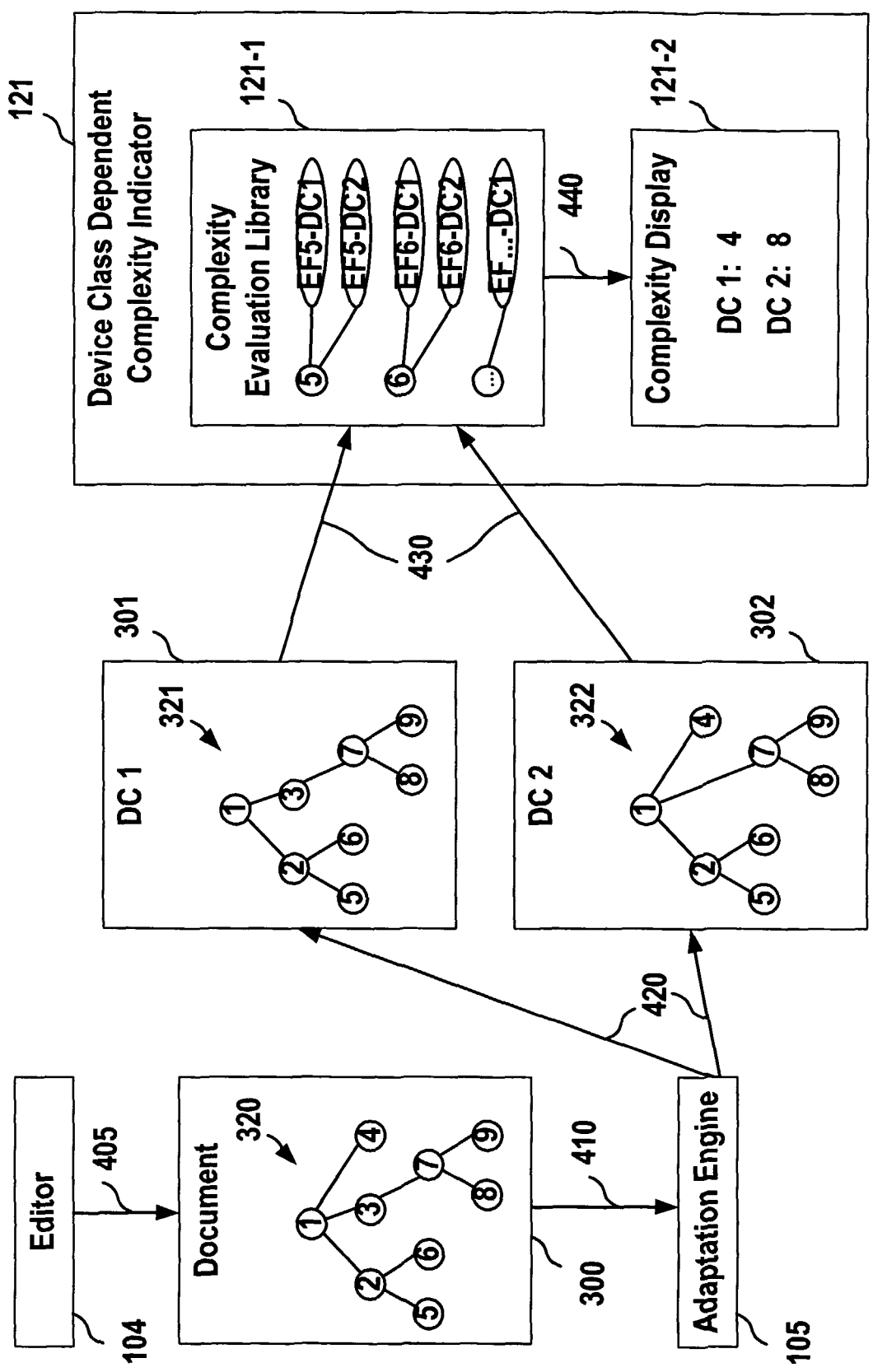
FIG. 8 illustrates details of a device class dependent complexity indicator as being part of the IDE.

The IDE 999 can further include a device class dependent complexity indicator 121 as shown in FIG. 8. The complexity indicator 121 has a complexity evaluation library 121-1 for evaluating the complexity of layout components used in the document 300 or its device specific representations 301, 302 and further has a complexity display 121-2 for visualizing the result of the complexity evaluation. High complexity of layout components usually has a negative impact on the usability of the user interface that includes the layout components.

The adaptation engine 105 receives 410 the document 300 created 405 with the editor 104 as input and generates 420 device specific representations of the document considering specific constraints of a device class (e.g., limited display area, memory constraints). In the example, a first representation 301 is generated for device class DC1 and a second representation 302 is generated for device class DC2. Each representation can have a layout component hierarchy 321, 322 that is different from the one 320 of the original document 300. In the example, the adaptation engine removed layout component 4 when generating the first representation 301 and layout component 3, when generating the second representation 302.

The complexity indicator 121 receives 430 information about layout components 1 to 9 and how these layout components are built into the layout component hierarchies 321, 322 of the document representations 301, 302. A layout component can include multiple basic layout elements (e.g., input fields) and group these layout elements in such a way that a specific function of the document (e.g., performing a search) is bundled in the layout component. Sometimes layout components are also referred to as controls.

The complexity indicator 121 determines the layout components and the layout component hierarchy 321, 322 of the respective representation 301, 302.

Further, the complexity indicator 121 calculates a complexity value for each layout component in its respective representation 301, 302. This can be achieved by using a complexity evaluation library 121-1 of the complexity indicator 121. It is sufficient that the complexity indicator can access the library 121-1, which may also be stored elsewhere within the IDE 999. The library 121-1 includes a set of complexity evaluation functions EF5-DC1, EF5-DC2, EF6-DC1, EF6-DC2, etc. Preferably, such an evaluation function exists for each layout component with respect to the various device classes DC1, DC2. This can also be achieved by associating the evaluation functions with specific layout component types, where each layout component is an instance of the respective layout component type. The association of the evaluation functions with the respective layout components is illustrated by a solid line between a layout component and its respective evaluation functions.

The complexity indicator 121 applies the evaluation functions for the various device classes to the layout components of the respective representations 301, 302. Each applied evaluation function returns a complexity value for the respective layout component. For example, return values may range from 1 to 10, where 1 indicates a low complexity of the component and 10 indicates a high complexity of the component. Any other appropriate measure can be used instead. Evaluation criteria used by the evaluation functions can, for example, refer to the number of items that can be displayed simultaneously in the display area of a specific device class or to the number of broken links of the layout component, dependent of the component layout type.

Then, the complexity indicator aggregates the returned complexity values for the various representations 301, 302 according to the respective layout component hierarchies 321, 322. Aggregate complexity values can be determined for the various levels in the layout component hierarchy 321, 322.

For example, layout component 2 represents a menu that includes two sub-menus (layout components 5 and 6). When applying the evaluation functions EF5-DC1 and EF6-DC1 to the sub-menus 5, 6 for the first device class DC1 (first representation 301), the aggregation algorithm may propagate the maximum complexity value of both sub-menus to the menu 2, assuming that the complexity value of the menu 2 cannot be less than the highest complexity value of is sub-menus. The same applies to the second device class DC2 when applying the evaluation functions EF5-DC2 and EF6-DC2. However, even when both sub-menus 5, 6 have a low complexity value, the overall complexity of the menu 2 can still be high. Therefore, in addition to propagating complexity values of child nodes in the layout component hierarchy to the parent node, an evaluation function can be applied directly to the parent node. For example, the sub-menus can have complexity values of 3 and 5. However, the usage of both sub-menus in the menu 2 can lead to a complexity value 7 for the menu 2 (parent node) itself. Thus, the propagated complexity value of the sub-menus max(3;5)=5 would be overruled by the complexity indicator with the higher complexity value 7 that is directly calculated for the parent node (menu 2).

The complexity indicator can then visualize 440 the various complexity values for the author in a complexity display 121-2. For example, the aggregate complexity value for the respective component hierarchy 321, 322 can be displayed for each device class DC1, DC2.

In an alternative implementation, the complexity indicator processes complexity evaluation hierarchies instead of layout component hierarchies. For this purpose, the IDE 999 can include a transformer that can transform the layout component hierarchy of each representation into a markup language independent complexity evaluation hierarchy. The complexity evaluation hierarchy includes the same information as the respective layout component hierarchy but is described in a generic language to which the evaluation functions can be applied. Using a language independent complexity evaluation hierarchy enables the complexity indicator to use a single set of evaluation functions being associated with components of the complexity evaluation hierarchy in the complexity library 121-1. This association becomes independent from the markup language being used for the original document 300 or its device specific representations 301, 302. The complexity hierarchy layer is an abstraction layer between the representations 301, 302 and the complexity indicator that helps to avoid that an evaluation function for a layout component needs to be redundantly provided for various markup languages, such as RIML, XHTML, HTML, etc.

Figure 9:
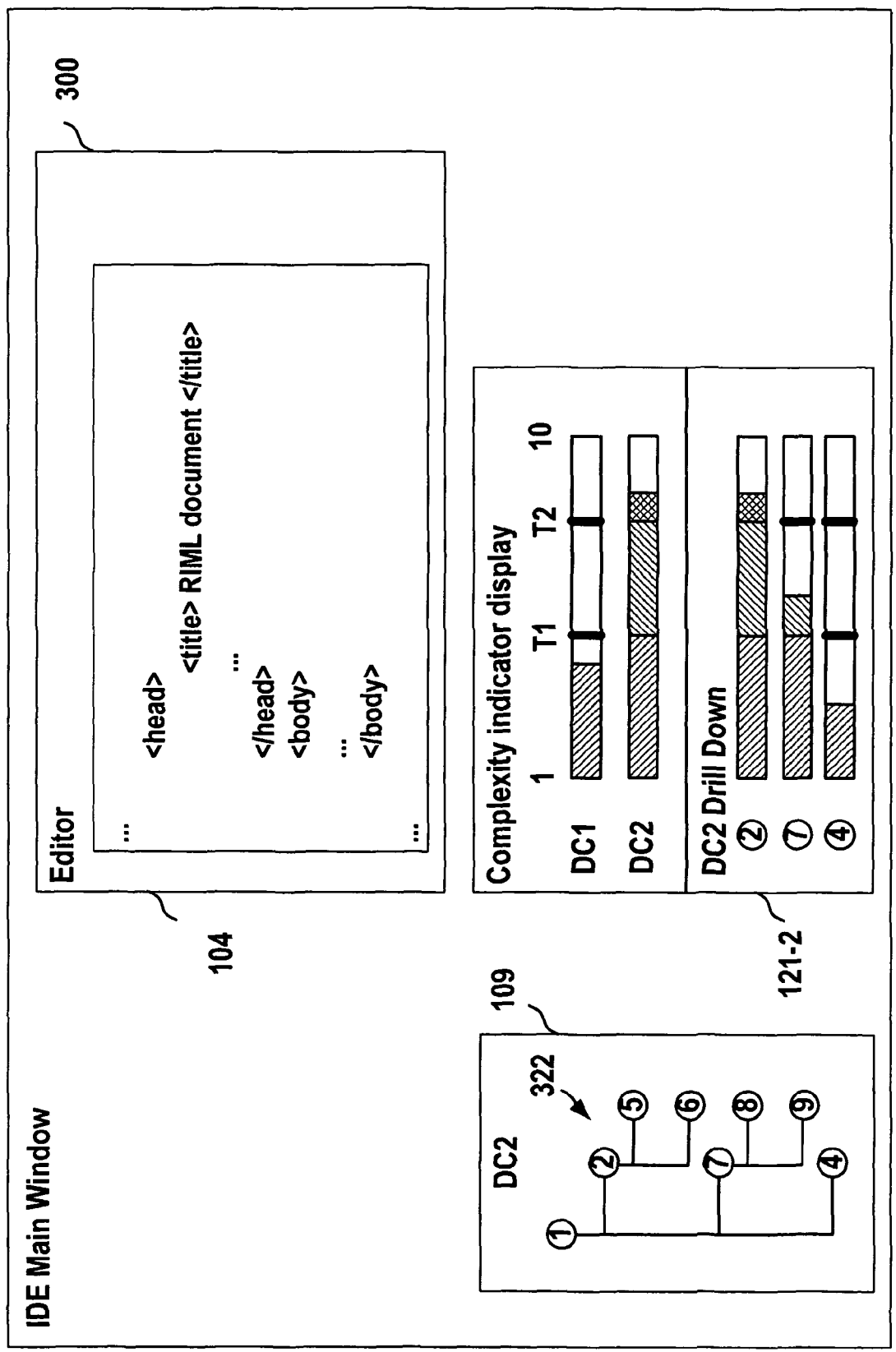
FIG. 9 shows an implementation of a complexity display when integrated into the IDE main window.

FIG. 9 shows an alternative implementation of the complexity display 121-2 when integrated into the IDE main window.

The complexity values for each device class DC1, DC2 are visualized as graphical bars. In the example, complexity values increase from the left value 1 to the right value 10. Threshold values T1, T2 are used to change the appearance of the bar dependent on the visualized threshold value. For example, complexity values below T1 have a first grid structure or a first colour. Complexity values between T1 and T2 have a second grid structure or a second colour and complexity values above T2 have a third grid structure or a third colour. Other presentations, such as traffic lights changing the colour when exceeding a threshold value, are also possible.

The complexity display 121-2 further can have a drill down section, where complexity values can be shown on different hierarchy levels down to the complexity of an isolated layout component for a selected device class. In the example, the drill down is made for the second device class DC2. Apparently, the high complexity value originates from the layout component 2, whereas the complexity value of layout components 4 and 7 is relatively low. A further drill down can be made for each of the layout components to determine the origin of high complexity values.

The tree-based outline editor 109 can be interfaced to the complexity indicator 121 so that, when it is displayed simultaneously, a layout component that is selected in the complexity display 121-2 is highlighted in the component hierarchy of the tree-based outline editor 109. In this example, the tree-based outline editor 109 displays the layout component hierarchy of the respective representation 302 that corresponds to the device class DC2 that is currently drilled down in the complexity indicator.

Embodiments of the invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. An computer program for device dependent authoring of user interface documents can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

The invention claimed is:

1. An integrated development environment for developing user interface documents, the integrated development environment comprising:
   a processor of a machine;
   an editor to edit a user interface document;
   an adaptation engine to generate device class specific representations of the user interface document, each device class specific representation referring to a respective device class; and
   a device class dependent complexity indicator to determine, using the processor of the machine, complexity values of layout components of the device class specific representations by accessing a library of stored complexity evaluation functions associated with the layout components, each combination of a layout component with respect to each device class having a distinct complexity evaluation function in the library, to calculate a complexity value for each of the layout components with respect to each of the respective device classes in the device class specific representations using the corresponding distinct complexity evaluation function accessed from the library, and to aggregate the complexity values of the respective device class specific representations into a single complexity value for each device class, the complexity values being numerical values.

2. The integrated development environment of claim 1, further comprising:
   a template wizard being interfaced to the editor to create a new user interface document by loading a predefined document template from the template wizard into the editor.

3. The integrated development environment of claim 1, where the editor is interfaced to a template XML description file including information about different available document templates, the information comprising meta data about device classes supported by the templates.

4. The integrated development environment of claim 1, further comprising:
   a tree-based outline editor to generate an outline view of the user interface document when loaded into the editor, the tree-based outline editor being interfaced to the editor so that selection of an element in the outline view causes the editor to highlight a corresponding text portion of the user interface document.

5. The integrated development environment of claim 1, further comprising:
   a code completion tool to propose possibilities for auto-insertion of text in the editor dependent on document context at a specific position within the user interface document.

6. The integrated development environment of claim 1, further comprising:
   a fragment repository to save from or loading to the user interface document a document fragment having a layout that is specific to a specific device class.

7. The integrated development environment of claim 1, further comprising:
   a Java filtering tool to hide Java code in the editor when using an XML view for editing the user interface document, and to edit Java code when activating a Java code view for editing the user interface document, wherein the editor is configured to save the user interface document including Java code independent from the current editing view.

8. The integrated development environment of claim 1, further comprising:
   a device class dependent frames layouting view being, interfaced to the editor to provide an overview of presentation structures of the user interface document for various device classes.

9. The integrated development environment of claim 1, further comprising:
   a device class dependent page view to use the adaptation engine to execute a pre-pagination run with respect to the device class specific representations and to visualize the result of the pre-pagination run for the respective device classes.

10. The integrated development environment of claim 1, wherein the device class dependent complexity indicator is replaced by a device class dependent page view to use the adaptation engine to execute a pre-pagination run with respect to the device class specific representations and to visualize the result of the pre-pagination run for the respective device classes.

11. The integrated development environment of claim 1, wherein the device class dependent complexity indicator is replaced by a device class dependent frames layouting view being interfaced to the editor to provide an overview of presentation structures of the user interface document for various device classes.

12. The integrated development environment claim 11, further comprising:
   a device class dependent page view to use the adaptation engine to execute a pre-pagination run with respect to the device class specific representations and to visualize the result of the pre-pagination run for the respective device classes.

13. A computer implemented method for generating user interface documents, the method comprising:
   loading a user interface document into an editor;
   generating device class specific representations of the user interface document using an adaptation engine, each device class specific representation referring to a respective device class;
   determining, using a processor of a machine, complexity values of layout components of the device class specific representations by:
      accessing a library of stored complexity evaluation functions associated with the layout components, each layout component with respect to each device class having a distinct complexity evaluation function in the library, and
      calculating a complexity value for each of the layout components with respect to each of the respective device class in the device class specific representations using the corresponding distinct complexity evaluation function accessed from the library, the complexity values being numerical values; and
   aggregating the complexity values of the respective device class specific representations into a single complexity value for each device class.

14. The method of claim 13, further comprising:
   providing an overview of presentation structures of the user interface document for various device classes.

15. The method of claim 13, further comprising:
executing a pre-pagination run with respect to the device class specific representations by using the adaptation engine; and
visualizing the result of the pre-pagination run for the respective device classes in a device class dependent page view.

16. The method of claim 13, wherein the determining and aggregating operations are replaced by the operations:
executing a pre-pagination run with respect to the device class specific representations by using the adaptation engine; and
visualizing the result of the pre-pagination run for the respective device classes in a device class dependent page view.

17. The method of claim 13, further comprising:
visually presenting the aggregated complexity value for each device class of the respective layout component hierarchies, the aggregated complexity value comprising a numerical value.

18. The method of claim 13, wherein the layout component hierarchy comprises a parent node and child nodes, the aggregating comprising propagating at least one of the complexity values of the child nodes in the layout component hierarchy to the parent node.

19. The method of claim 18, further comprising, overruling the at least one of the complexity values propagated to the parent node with a higher complexity value calculated for the parent node using an evaluation function corresponding to the parent node.

20. A tangible machine-readable storage medium not comprising transitory signals and storing instructions, which when executed by at least one processor, provide operations comprising:
loading a user interface document into an editor;
generating device class specific representations of the user interface document using an adaptation engine, each device class specific representation referring to a respective device class;
determining complexity values of layout components of the device class specific representations by:
accessing a library of stored complexity evaluation functions associated with the layout components, each a layout component with respect to each of device class having a distinct complexity evaluation function in the library, and
calculating a complexity value for each of the layout components with respect to each of the respective device class in the device class specific representations using the corresponding distinct complexity evaluation function accessed from the library, the complexity values being numerical values; and
aggregating the complexity values of the respective device class specific representation into a single complexity value for each device class.

21. The method of claim 18, wherein the propagating at least one of the complexity values comprises propagating a maximum complexity value of the child nodes to the parent node.

* * * * *